United States Patent [19]

Iler

[11] 3,969,266
[45] July 13, 1976

[54] MICROPOROUS MEMBRANE PROCESS FOR MAKING CONCENTRATED SILICA SOLS

[75] Inventor: Ralph K. Iler, Wilmington, Del.

[73] Assignee: E. I. Du Pont de Nemours and Company, Wilmington, Del.

[22] Filed: July 2, 1973

[21] Appl. No.: 375,943

Related U.S. Application Data

[63] Continuation-in-part of Ser. No. 231,716, March 3, 1972, abandoned, which is a continuation-in-part of Ser. No. 54,864, July 14, 1970, abandoned.

[30] Foreign Application Priority Data

June 23, 1971   Canada ............................... 116479

[52] U.S. Cl. .............................. 252/313 S; 252/314; 252/317
[51] Int. Cl.² .................. B01J 13/00; C01B 33/14
[58] Field of Search .............................. 252/313 S

[56]          References Cited
          UNITED STATES PATENTS

| | | | |
|---|---|---|---|
| 2,572,578 | 10/1951 | Trail ................................ | 252/313 S |
| 2,668,149 | 2/1954 | Iler ................................... | 252/313 S |
| 3,560,400 | 2/1971 | Chilton ........................... | 252/313 S |
| 3,582,494 | 6/1971 | Vossos et al. .................... | 252/313 S |

*Primary Examiner*—Richard D. Lovering

[57]   ABSTRACT

Aqueous silica sols having a pH from 8 to 11 containing 1 to 40% by weight of colloidal silica and soluble salts can be purified and concentrated by filtering the soluble salt from the sol using a microporous membrane filter while maintaining the salt concentration within a range determined by the concentration of silica in the sol. In one embodiment, colloidal silica particles are grown to a larger size by starting with a sol of nuclei, and adding sodium silicate solution and acid.

6 Claims, No Drawings

MICROPOROUS MEMBRANE PROCESS FOR MAKING CONCENTRATED SILICA SOLS

CROSS REFERENCE TO RELATED APPLICATIONS

This application is a continuation-in-part of my copending application Ser. No. 231,716, filed Mar. 3, 1972, now abandoned which application is a continuation-in-part of my then copending application Ser. No. 54,864, filed July 14, 1970, now abandoned.

BACKGROUND OF THE INVENTION

Several methods of producing silica sols have been studied and disclosed in the prior art. Preparation of dilute silica sols from silicate and acid is described in Alexander et al. U.S. Pat. No. 2,601,235. Example 2 of U.S. Pat. No. 2,601,235 describes a process by which sodium silicate and sulfuric acid are reacted in the presence of silica nuclei. By controlling the reaction conditions, newly formed silica is deposited on the nuclei present. The existing silica particles grow in size and no new nuclei form. The colloidal silica particles produced in this manner are relatively uniform in size and are dense. However, this Example has as its object a precipitated silica; no provision is made for removal of the reaction byproduct, sodium sulfate, while maintaining the sol in a stable condition.

U.S. Pat. No. 2,605,228 also teaches the reaction of sodium silicate and acid to produce colloidal silica. In this process no nuclei are present and, under the conditions described, the silica formed is sufficiently porous to contain occluded sodium ions. As in the process previously described, the reaction byproduct is a sodium salt which is not removed until the silica in the sol is precipitated. Neither process teaches a method of removing salt from a stable silica sol.

Ion exchange resins have been used to remove salts from silica sols; alternatively, silica sols can be made without a salt as a byproduct by the reaction of metallic silicon and water. (See Balthis, U.S. Pat. No. 2,614,995.) The use of metallic silicon or ion exchange resins to obtain saltfree, concentrated silica sols involves significant expense. Further, the sols produced by these methods contain porous, sponge-like silica particles. Achieving highly concentrated sols of these porous particles is extremely difficult. (See Iler, Colloid Chemistry of Silica and Silicates, p. 98, Cornell University Press, 1955.)

The process of this invention provides a path to stable concentrated silica sols without requiring the use of expensive ion exchange resins. Microporous membranes are used in this process to separate water and soluble salts from silica sols. The use of such microporous membrane filters is well known for several processes, for example, separation of proteins from blood plasma. Microporous membrane filter, also called ultrafilters, are commercially available in a number of pore sizes.

Chilton, U.S. Pat. No. 3,560,400 describes the removal of water from a dilute silica sol by ultrafiltration. However, the reference states that poor results are achieved by filtering sols of pH 9 to 11 and states that improved results are obtained if the sol is treated with a cation exchange resin to lower the pH to 2-4. Thus, Chilton teaches removal of water but not salts from sols. Further, Chilton does not deal with the problems associated with silica sols having a basic pH. In particular, Chilton does not teach how to avoid the formation of aggregates of colloidal silica particles which results in a rapidly increasing viscosity of the sols prior to obtaining the desired concentration. Such silica aggregates are deposited on the ultrafilter membrane, reducing the filtration rate to an impractically low value, and the membrane must be repeatedly cleaned. It is not practical to operate an ultrafilter under such adverse conditions. This invention provides a process having conditions within which microporous membrane filters can be effectively used to remove water and salts from a silica sol having a basic pH.

SUMMARY OF THE INVENTION

This invention relates to a process for removing water and a salt selected from the group consisting of sodium chloride, sodium carbonate and sodium sulfate from an aqueous silica sol having a pH from 8 to 11 containing from 1 to 40% by weight of silica particles having an average diameter within the range of 5 to 50 millimicrons and the salt in concentrations less than 0.25 normal comprising filtering an aqueous solution of the salt from the sol using a microporous membrane having pores smaller than the silica particles and adding water to the sol to maintain the sodium salt concentration from $$N = 0.005 \text{ to } N = 0.26 - 0.005C - 0.002 (T-40)$$

wherein N is the normality of salt in the sol, T is temperature in degrees centigrade and milliliters equals grams of silica per 100 milliliters of the sol when C is less than 30 and from $$N = 0.005 \text{ to } N = 0.158 - 0.0012T$$

when C is at least 30.

The preferred maximum allowable concentration of sodium ions present while the silica sol is being ultrafiltered to remove soluble salts is related to the silica concentration and temperature by the following equation, where $N_{80}$ and $N_T$ are greater than 0.005;

$N_{80}$ is the normality of the salt in the sol when ultrafiltering at 80°C.;

$N_T$ is the normality of the salt in the solution at T°C.;

T is the temperature in degrees centigrade at which ultrafiltration is carried out; and C is the concentration of silica expressed in grams of $SiO_2$ per 100 milliliters.

$$\log_{10}C = -2.2 - 3.2 \log_{10}N_{80} \text{ and } N_T = N_{80} + 0.002 (80-T)$$

DESCRIPTION OF THE PREFERRED EMBODIMENTS

In the reaction between acids and silicates to form silica sols, several different acids and alkali metal silicate compounds can be used. For reasons of economy, sodium silicate is generally reacted with carbon dioxide, hydrochloric acid, or preferably, sulfuric acid. The reaction conditions must be carefully controlled to produce a stable silica sol free of aggregated colloidal particles There are basically two ways in which colloidal silica particles in the commercially useful size range 5 to 50 millimicrons or more can be obtained.

I. Rapid Formation of Porous Colloidal Silica Particles Promoted by Maximum Allowable Concentration of Sodium Ions Present A solution of sodium silicate containing sodium ions at a concentration of 0.25 to 0.6 normal is heated to 80° to 100°C. A solution of acid, such as sulfuric, is added with intensive mixing so that the solution remains alkaline throughout its volume. Sufficient water must be added with the acid to dilute the solution to a sodium sulfate normality less than 0.25 at the stage where the acid neutralizes 80 to 95% of the original alkali in the silicate. Under these conditions particles of silica grow rapidly at a rate depending on the concentration of sodium ion present. When the sodium normality is between 0.35 and 0.25 during the neutralization, particles 10 to 20 millimicrons in size are formed in the 20 minutes required for addition of the acid. However, these particles are microporous and contain adsorbed or occluded water and sodium ions. At a given concentration of sodium ions in solution, the porosity is greater when the particles are formed at lower temperature.

When the sodium concentration in the sol is later reduced, the occluded sodium emerges from the particles. When the sol is then heated at 100°C., the particles shrink somewhat and become non-porous.

Once the sol has been formed by this method, it should be cooled to 40°C. and sodium ions should be removed promptly by addition of water and removal of sodium sulfate solution by ultrafiltration.

In this process the formation of particles is so rapid that there is little advantage to be gained by ultrafiltering during particle formation.

It is my theory that in this process the acid liberates from the silicate ions very small sub-colloidal units or silicic acid molecules below the generally recognized minimum colloidal particle size of 5 millimicrons. These sub-colloidal units are probably 1 or 2 millimicrons in diameter. These are caused to aggregate in the process by adsorbing sodium ions, forming porous aggregate particles larger than 5 millimicrons. The theorized sub-colloidal units are firmly bonded together in the colloidal particle The growth of colloidal particles is rapid because it is an aggregation process, rather than a molecular process whereby $SiO_2$ units are added one by one.

In this process the sodium ion concentration must be reduced by dilution with water as the silica concentration is increased by ultrafiltration.

II. Slow Growth of Non-porous Silicon Particles with Minimum Concentration of Sodium Ions Present In this process the concentration of sodium ion in the sol is maintained less than 0.2 normal and the sol is heated to at least 80°C. while particles are being grown. Preferably, the sol is heated to at least 90°C. and the sodium concentration is less than 0.15.

Particles grow slowly by addition of $SiO_2$ molecules and possibly dimers, trimers. If sodium concentration is low, particles are non-porous. Particles grown by this process and at maximum sodium concentration may be somewhat porous but not to the extent of those grown by the first process.

This process is characterized by starting with a sol of nuclei, i.e., colloidal particles which are to be grown to larger size, and growing them by adding sodium silicate solution and acid.

Sodium salt, e.g., sulfate, concentration should not exceed about 0.2 normal and the pH should be in the range 8 to 10. The particle growth and ultrafiltration are carried out at 80° to 110°C. Particle growth can be continued to increase the silica concentration of a sol from about 1 to about 10% by weight silica particles.

The concentration of silica based on the combined feed streams of water, silicate and acid should not exceed about 0.6 times the weight ratio of $SiO_2:Na_2O$ in the sodium silicate used. The preferred sodium silicate has a $SiO_2:Na_2O$ ratio of 3.25:1. The ratio of acid to silica should be such as will maintain the pH of the sol at from 8 to 10 preferably 8–9.5.

The rate of addition of acid and silicate must be limited so no new silica particles are formed. The specific surface area of the silica in the sol will constantly decrease if no new silica particles are being formed. Generally speaking, the rate of addition of silica in the form of sodium silicate should not exceed about 15 grams of $SiO_2$ per hour per 1000 square meters of area of silica surface of the initial nuclei particles.

The sol made in this manner can be accumulated and then ultrafiltered. However, it is also possible to ultrafilter a portion of the sol while the particles are being grown. This simultaneous particle growth and ultrafiltration removes sodium sulfate and this minimizes formation of new nuclei by aggregation.

Only one sol tank is needed to carry out the ultrafiltration and removal of sodium salts while the silica particles are being grown through the simultaneous addition of acid and sodium silicate solutions to the sol, at a temperature greater than 80°C. However, the simultaneous formation and ultrafiltration of a sol may tend to cause the ultrafiltrater to become plugged and require more frequent cleaning with alkali. This is believed due to freshly formed, so-called "active" silica particles smaller than 50 Angstroms in size which can enter and become lodged in the pores in the surface of the ultrafilter. When the filtration rate becomes uneconomical, the filter has to be treated with dilute alkali to dissolve the silica and restore its high capacity.

The alternate procedure is to make the sol first and ultrafilter it later. Any very small silica particles which are small enough to enter the pores of the ultrafilter thus have time to redissolved and soluble silica deposited upon the larger colloidal silica particles. Thus the ultrafilter does not become fouled or plugged, and does not require frequent cleaning. An alternate possibility is to have a series of hold-tanks between the reaction vessel and the ultrafilter through which the sol requires sufficient time to pass to allow the particles smaller than 50 Angstroms in size to disappear.

In further explanation, when sodium silicate is neutralized to pH 9 upon being added to the sol-polymerization system, the polysilicate ions are converted to correspondingly small silica particles of such a size that they can enter the ultrafilter pores, but become trapped as they reach constrictions in the pores. Once this deposition of silica begins, ultrafiltration becomes progressively slower. However, if suitable time is allowed, the more soluble particles smaller than 50 Angstroms will dissolve and the silica is deposited upon the larger particles which are less soluble due to their larger radius of curvature in accordance with the natural laws of thermodynamics. The solubility of silica particles rises rapidly with increasing particle diameter smaller than about 50 Angstroms.

Whether or not this plugging action can occur depends to some extent on the temperature at which the sol is being ultrafiltered, the pH, and/or the sulfate concentration. If the sodium silicate is being neutralized with acid at a temperature less than 70° or 80°C., for example 60°C., the silica particles smaller than 20 or 30 millimicrons disappear from solution more slowly, and more of these can enter and plug the filter. If the pH is less than 9, or if the sodium sulfate concentration is near the prescribed upper limit, the very small particles aggregate to form microgel before they can dissolve, and the silica deposited on the larger nuclei. This microgel also blinds the ultrafilter membrane because it cannot diffuse by Brownian motion away from the membrane surface against the flow of solution toward and through the membrane.

The time required for the particles less than 50 Angstroms in size to disappear, at 80°–90°C., is apparently less than about 5 minutes, and may be as little as one minute. Sols which have been grown to the desired particle size and the addition of silicate and acid then stopped, need only to be held for a few minutes at 80°–90°C. in the pH range of 9–10 to become free of particles which plug the ultrafilter.

If a sol is being grown in particle size while it is being ultrafiltered, it is preferable to provide a baffled holdtank so that the hot sol from the reaction tank where acid and silicate are being added is held or "aged" for at least a minute or so before it passes through the ultrafilter and returned to the reaction tank.

Ultrafiltration

It is important that the colloidal particles are large enough when ultrafiltration begins that they do not pass through the membrane and are too large to enter and plug the pores.

Aggregation of the ultimate particles must be avoided, since this also blinds the membranes. Aggregation can be detected by several methods. The sol can be diluted to 0.01 concentration of $SiO_2$ and then applied to a hydrophilic surface of a supporting film conventionally employed as a base for electron microscope examination. The membrane itself can be made hydrophilic by treating it with a 0.5% solution of brovine albumen, draining and drying, before applying the diluted sample of silica sol and rinsing off the excess silica. Another method is by ultracentrifuging. The centrifuging conditions of centrifugal force, time and settling distance are selected so that no more than 2 or 3% of the silica in a 2% sol of non-aggregate particles will be recovered as sedimented cake. Samples of sols of this particle size in which particles have begun to aggregate, when centrifuged under the same conditions, yield an additional amount of silica in the centrifuged cake corresponding to the fraction of silica present in the form of aggregates rather than discrete particles. Similarly, at a given silica concentration, the absorbence of 400 millimicron light in a spectrophotometer is determined for nonaggregated silica particles of a given size. Such a sol, when partially aggregated, has a higher absorbence, the change in absorbence being a measure of aggregation.

It is important to avoid aggregation during the preparation and further treatment of the silica sol for two reasons: (1) Aggregates (or microgel particles) seriously interfere with the passage of water through the microporous membrane filter in subsequence purifying and concentrating the silica sol by microporous membrane filtration. (2) Aggregated particles increase the viscosity of the sol, so that when the sol is finally concentrated to 30 to 40% by weight of $SiO_2$, the viscosity is greatly increased by the presence of aggregates, and if a substantial portion of the silica particles are present as aggregates or microgel, the sol will solidify before the final desired concentration is reached.

Microporous membrane filtration or ultrafiltration is the use of a filter having pores of such size that water and soluble salts will pass through the pores, but particles of colloidal size, such as 5 to 50 millimicrons, will not pass. The pore size of the membrane is selected so that the pore diameter is smaller than the particles in the sol, so that the particles cannot pass through. On the other hand, one should use a filter membrane having the largest sized pores that will not pass the particular size of silica particles present, since larger pores permit the water and the sodium sulfate solution to be removed from the silica more rapidly.

While membranes having pore diameters somewhat greater than 10 millimicrons are useful for preventing the passage of some of the larger silica particles involved in this invention, membranes with pore diameters less than 10 millimicrons are preferred. Membranes and filtration equipment resistant to alkali should be employed, since removing residual or deposited silica from the apparatus from time to time with warm 5% sodium hydroxide solution is highly beneficial.

The manner of operating the ultrafilter will be apparent to those skilled in the art, e.g., pressures, filtration rates, and circulation rates. Generally speaking, the sol being ultrafiltered to remove water and sulfate should be circulated past the surface of the membrane or otherwise agitated to prevent concentration polarization. This is particularly important in the case of colloidal silica, since a layer of highly concentrated silica sol at the surface of the membrane should not be permitted to form because, unlike many organic colloids, the silica may spontaneously gell if the concentration exceeds a certain value. A degree of turbulence or circulation velocity should be employed such that a further increase in turbulance or velocity does not cause a proportionately greater rate of flow through the filter, as is known to those skilled in the art.

It is an essential feature of this invention that as the silica sol is concentrated by the removal of sodium salt solution through the ultrafilter, water must be added to the sol so that the concentration of silica in the sol does not exceed a maximum level determined by the concentration of sodium sulfate in the sol. As sulfate ion is removed from the sol, higher silica concentrations can be attained without danger of aggregation of the particles. Conversely, the higher the concentration of sodium sulfate, particularly at the beginning of the ultrafiltration step, the more critical are the upper limits of silica concentration and temperature.

Sodium ions present as sodium sulfate accelerate the irreversible aggregation of silica particles in an alkali-stabilized silica sol. Such aggregation, which precedes formation of gel, is undesirable for several reasons. For example, it limits the concentration to which the sol can be later concentrated without a large increase in viscosity. Also, aggregates plug the ultrafilter membrane and reduce the economic advantage of the ultrafiltration process by requiring more frequent cleaning of the membrane with alkali. This invention defines process conditions for silica sol ultrafiltration that minimize aggregation yet permit sols of maximum silica concentration to be processed while being maintained at a pH between 8 and 11.

The maximum allowable concentration of sodium ions that can be present in processing the silica sol without appreciable aggregation of silica particles can be expressed by an empirical equation which can guide those skilled in the art to successfully follow the teachings of this invention:

$$N = 0.26 - 0.005C - 0.002(T-40)$$

where
 $N$ = maximum normality concentration of sodium salt in sol
 $C$ = concentration of colloidal silica in grams $SiO_2$ per 100 mls.
 $T$ = temperature in degrees centigrade.

The equation is valid up to about $C=30$. At higher silica concentrations the sodium salt normality at 90°C. may range from 0.005 to 0.05 although as will be discussed in greater detail it is preferred to maintain the salt concentration within optimum operating limits of 0.02 to 0.03 normal. When C is higher than 30 and temperature is lower than 90, higher normalities are tolerated. Thus the relationship between sodium normality and temperature of the silica sol when the concentration of the sol is 30 grams of silica per 100 mils or more is $N = 0.158 - 0.0012T$ where T and N are defined as above.

It should be noted at this point that the term "a 40% sol" means 40 grams of silica per 100 grams of sol. In contrast, C is defined in the above equation as grams per 100 ml. of sol. Since the densities of water and colloidal silica differ, the terms percent and grams per 100 ml. are not equivalent. A 30% sol contains 37 grams of silica per 100 ml. of sol, a 40% sol 52 grams per 100 mils and a 50% sol 67 grams per 100 ml.

It is to be understood that the maximum value of N may vary by 10 or 20% depending on the factor of time. Thus, for example, the maximum allowable salt content in a sol at a given temperature depends on the time the sol is held or "aged" under these conditions. The equation is based on the assumption that under practical operating conditions, times ranging from half an hour to half a day may be required as the sol is being processed at temperatures above 30°C. More rapid processing allows the presence of somewhat higher concentrations of sodium salt; thus, for example, if a sol containing 0.25 normal sodium ions is formed in 20 minutes from acid and silicate at 90°C., the sodium content is too high if the sol is to be further processed for a longer time at this temperature. But if the sol is to be cooled promptly for processing below 50°C., the sodium concentration of 0.25 is permissible.

Similarly the particle size of the silica is a factor. For a given silica concentration and temperature, a sol of larger particles, 20 millimicrons, is more stable than one of smaller particles at the same sodium normality. Thus with larger particles a somewhat higher normality of salt can be permitted than with smaller particles. However, the equation generally represents the upper limit of sodium concentration in processing silica sols in this invention. Generally speaking, the difference in particle size will not affect the value of N more than 10 or 20%.

When operating under conditions such that the sodium salt concentration approaches these prescribed upper limits, some of the particles may aggregate due to the lower ionic repulsion between particles at such high sodium salt concentration. Such aggregates, though still of colloidal size, nevertheless contribute to turbidity and to viscosity. In cases where it is not necessary to concentrate the sol to a maximum possible silica content to save shipping costs, some aggregates in the sol are not objectionable, for example in making silica gel.

On the other hand, if the sol is to be concentrated to maximum silica content with lowest viscosity and maximum stability, aggregation must be kept to a minimum. In this case the ultrafiltration must be conducted under preferred conditions of lower maximum allowable concentration of sodium salt.

I have found, surprisingly, that the relation between the maximum amount of sodium sulfate in the sol that can be tolerated for a one or two hour period without appreciable aggregation of the silica particles is related to the silica concentration by a relatively simple mathematical relationship which appears to be valid over a wide range of silica concentrations from 1 to 40% by weight:

The preferred maximum allowable concentration of sodium ions present while the silica sol is being ultrafiltered to remove soluble salts is related to the silica concentration and temperature by the following equation, where $N_{80}$ and $N_T$ are greater than 0.005;
$N_{80}$ is the normality of the salt in the sol when ultrafiltering at 80°C.;
$N_T$ is the normality of the salt in the solution at T °C.;
T is the temperature in degrees centigrade at which ultrafiltration is carried out; and
C is the concentration of silica expressed in grams of $SiO_2$ per 100 milliliters.

$$\log_{10} C = -2.2 - 3.2 \log_{10} N_{80}$$

$$N_T = N_{80} + 0.002(80-T)$$

Thus, for example, when T = 80°C. the corresponding values of C and $N_{80}$ are:

| C | $N_{80}$ | $N_T$ where T = 30°C. |
|---|---|---|
| 1 | 0.204 | 0.264 |
| 2 | 0.165 | 0.225 |
| 4 | 0.133 | 0.193 |
| 10 | 0.10 | 0.16 |
| 30 | 0.07 | 0.13 |

Ultrafiltration will generally be carried out above ordinary temperature or 30°C. because the filtration rate is more rapid at elevated temperature; but generally the temperature will not exceed about 80°C. which is the upper allowable temperature for some membranes. Also, the sol will preferably be maintained in the pH range from 8.5 to 10.0.

Arrangement of the Ultrafiltration Operation

The ultrafiltration is carried out on the dilute starting sol first in such a way as to reduce the sulfate ion concentration. The sol can be diluted with water and reconcentrated by ultrafiltering. However, it is advantageous to add water while simultaneously withdrawing the sodium sulfate solution from the sol. The ultrafiltration can be carried out in a series of filters, each operating at a constant composition of sol. The purification and concentration is carried out until the silica sol concentration reaches at least about 30% $SiO_2$ and the sulfate normality is less than 0.05 N.

The sol from the first process described above from which most of the sulfate has been removed (i.e., less than 0.05 N) is heated at 100°C. for from 6 to 24 hours, or at up to 200°C. for progressively shorter periods of time in order to reduce the porosity of the silica particles. The particles formed in the presence of sodium sulfate contain adsorbed sodium and have a specific surface area much higher than that corresponding to the exterior surface of the particles. However, after the sulfate concentration has been reduced to 0.05, preferably to 0.02 N to 0.03 N, the sol is then heated to about 100°C. or higher until the specific area of the silica as determined by titration, as described by G. W. Sears, Jr. (Analytical Chemistry, 28, 1981, December, 1956) is reduced to about 3000/D, where D is the average diameter of the particles of silica as determined in electron micrographs. Alternatively, the size of the densified particles can be determined by heating the sol for 24 hours at 100°C. and then titrating to determine surface area of the particles, which are then completely densified. For the production of suitable densified particles, somewhat shorter times and temperatures can be employed, but, generally speaking, the time and temperature will be such that the specific surface area will be no more than 10 or 20% higher than 3000/D, where D is the diameter of the densified particles.

It has been discovered that if the salt or electrolyte such as sodium sulfate is removed from silica sol by ultrafiltration, the sodium ions which provide the positive charge to neutralize the negative charge on the silica sols are not removed and the sol retains a pH of above 8. In the pH range of 8 to 10, the particles are highly charged and do not aggregate. However, if such a sol is concentrated to above about 30% $SiO_2$, as in the case of 15 millimicron particles, the viscosity increases rapidly. The sols become so viscous that they will not flow through the apparatus and ultrafiltration becomes exceedingly slow.

If a small but well defined concentration of salt is left in the sol, it can then be concentrated further before the viscosity begins to increase. The amount of sodium sulfate, for example, that is required to minimize viscosity for ultrafiltration at concentrations over 30% silica is in the range of about $N = 0.005$ to $N = 0.0158 - 0.0012T$ where T and N are defined as above. The preferred range is $N = 0.02$ to $0.03$.

Accordingly, in the process of this invention, as the sol is being purified and concentrated, the sodium concentration in the later stages of the purification should not fall below this preferred range. When this concentration of sodium sulfate is obtained in the sol, then the silica is concentrated by ultrafiltration without further addition of water.

This invention will be further illustrated in the following examples.

EXAMPLE 1

In a steel tank having a capacity of 10 volumes was placed 6.34 volumes of a solution of sodium silicate containing a weight ratio of $SiO_2:Na_2O$ of 3.25:1.0 and containing 3.48% by weight of $SiO_2$. A centrifugal circulation pump having a capacity of 5 volumes per minute was connected to withdraw solution from the bottom of the tank, pass it through a heat exchanger, and inject it into the top of the tank. The solution was circulated while steam was passed through the heat exchanger and the solution was heated to 95°C. During the next 20 minutes, 1.42 volumes of a 0.65 N sulfuric acid solution was added through an orifice into the intake of the pump at a point of high turbulence. Then over the next ten minutes, 0.245 volumes of 3.6 N sulfuric acid was added in the same manner. Immediately the sol was cooled by continuing the circulation and passing cold water through the heat exchanger instead of steam; the temperature was reduced to less than 60°C. in 10 minutes, and to 40°C. in 20 minutes. The cooled sol contained 3.1% by weight of $SiO_2$, and had a sulfate concentration of 0.25 N. A sample of sol filtered through No. 1 Whatman filter paper had a turbidity corresponding to an absorbence of 0.15 or a transmittance of 71% as measured with a spectrophotometer (Coleman Junior II Model 6/35) using light of wavelength of 400 millimicrons and a cuvette of 21 millimiters internal diameter.

The sol was then circulated through an ultrafilter having a filtration area of 0.7 sq. ft. at a temperature of 40°C. The sol passed through channels past the surface of the filter membrane, with a linear velocity of about 2 ft. per second, giving a turbulence corresponding to a Reynolds number of over 3000. The pressure of the sol on the membrane varies from 15 psi at the entrance to 7.5 psi at the exit of the circulating stream, thus averaging about 10 psi.

The ultrafiltration membrane is a sheet of fibrous material coated with a microporous film, the pores having a nominal diameter of about 10 millimicrons, but which is found not to permit the passage of colloidal silica particles having a diameter of 8 millimicrons, so that the effective pore diameter is probably no larger than 5 or 6 millimicrons. (The membrane employed is known as type XM-100, manufactured by Amicon, Inc., of Lexington, Mass.) The rate of removal of sodium sulfate solution from the colloidal silica was 250 pounds of solution per square foot per day.

As sodium sulfate solution was removed from the sol, water was added to maintain a constant silica concentration and filtration was continued until the normality of sulfate in the sol was reduced to 0.20. The capacity of the filter was such that this was accomplished in half an hour. At this point filtration was continued without addition of water until the silica concentration reached 5%. The silica was then further concentrated by removing sodium sulfate solution through the filter, while at the same time water was added at a rate less than the rate of removal of filtrate, so that the sodium sulfate concentration was reduced to 0.17 N, while at the same time the silica concentration was increased to 10%. The concentration of sulfate in the effluent or filtrate was similar to that in the sol. The sulfate concentration was determined periodically by measuring the conductivity of the filtrate. The silica concentration was determined approximately by measuring the specific gravity. The pH of the sol and of the filtrate remained at about 10.

Further addition of water and removal of sodium sulfate solution was continued similarly until the concentration of the silica reached 20 grams per 100 mils., and the sodium sulfate concentration was reduced to 0.10 N. The sulfate concentration was then reduced by continuing ultrafiltrating to remove sodium sulfate solution, by adding 1.38 volumes of water continuously to maintain the silica concentration constant at 20 g./100 mls. This reduced the sulfate concentration to 0.025 normality.

The sol was then heated at 98°C. for 16 hours to densify the particles, and then further concentrated by ultrafiltration without the addition of water, until the silica concentration was 40% by weight. During this final concentration, the sulfate concentration is somewhat further reduced to 0.015 N, because when such a concentrated sol is ultrafiltered, the concentration of salt in the filtrate is somewhat higher than in the sol. The resulting concentrated sol had a viscosity of 40 cps. as measured in an Ostwald viscosity pipette at 25°C. The pH of the sol was 9.8 and over 80% of the silica is recovered as colloid.

EXAMPLE 2

5.75 Liters of sodium silicate solution containing 3.48% silica and having a weight ratio of silica to sodium oxide of 3.25 was placed in a 10 liter steel tank fitted with a steam coil and agitator, and stirred until the temperature reached 97°C. The agitator was near the center of the tank with the blades along the shaft extending nearly to the bottom of the tank, and the sides of the blades and rotation was such that a vortex was created in the tank. Acid was added through a ⅛ inch diameter tube into the vortex of the silicate solution. First 1.42 liters of 0.65 N acid was added in 20 minutes, and then 0.22 liters of 3.6 N acid added in 12 minutes, while the temperature was maintained between 93° and 96°C. There was obtained 7.4 liters of silica sol containing 2.7% silica having a pH of 10, in which 86% of the alkali originally present in the sodium silicate had been neutralized with acid and the sodium sulfate normality was 0.23. The sol had an absorbence of 0.18 for light of 400 millimicron wavelength. This sol was ultrafiltered at 40°C. in a device like that described in Example 1. About 7% of the silica passed through the membrane along with the sodium sulfate. The sol was circulated through the pressure side of the filter, maintaining an average pressure drop across the membrane of 12 lbs./sq. in. Then as the aqueous solution of sodium sulfate and soluble silica passed through the membrane, water was added to the circulating sol to maintain a constant volume. Filtration was continued for 30 minutes, during which time 3 liters of water was added to the sol at a rate of 0.1 liter per minute. The sodium sulfate concentration was reduced to 0.15 normal and the silica concentration was 2.5%. The sol was then further ultrafiltered without addition of water, until the volume was reduced to 1.9 liters and the silica concentration increased to 10 grams/100 mls. Then sodium sulfate was further removed by continued ultrafiltration at constant silica concentration by adding 4.3 liters of water while removing an equal volume of dilute sodium sulfate solution through the filter. This reduced the sodium sulfate concentration to less than 0.02 normal. The sol was then heated at 100C. as in Example 1 and ultrafiltered to 40% by weight of $SiO_2$. During the final stages of concentration, the rate of removal of dilute sodium sulfate solution decreased to 10 mls. per minute. The final sol product contained 40% by weight of silica, at a pH of 9.8, and contained about 0.1% by weight of sodium sulfate, and had a viscosity less than 50 centipoises. A sample of sol diluted to 3 grams of $SiO_2$/100 mls. had an absorbence of less than 0.5 or a transmittance of greater than 31.5% for 400 millimicron wavelength light.

EXAMPLE 3

A sol can be prepared as in Example 1 as follows:

A sol is prepared using a type of mixing equipment in which the sodium silicate solution is heated to 93°C. and passed through a mixer into which one-fifth of the 0.65 normal acid is added, thence to a hold-tank where the average residence time is 5 minutes. The partially neutralized sol is pumped from this tank through another mixer in which another one-fifth of the 0.65 normal acid is added and then to a second hold-tank, where the residence time is 5 minutes, and so on. After the fifth hold-tank, one-fifth of the 3.65 normal acid is similarly added at a mixer, going to a smaller hold-tank having an average hold time of 2 minutes, whereafter it goes to another mixer in which another one-fifth of the 3.65 normal acid is added before going to another hold-tank, etc. In this manner, the acid is added in ten stages, the partially neutralized sol being held at above 90°C. in containers between mixers so that the neutralization is carried out continuously and the sol is produced continuously, yet the time, temperature, and concentrations during the stages of neutralization are similar to those in the batch neutralization process of Example 1. This sol is purified and concentrated by the procedure of Example 1.

EXAMPLE 4

This is an example of the effect of salt concentration on the viscosity and stability of a concentrated sol. A sol containing 40 grams of $SiO_2$ per 100 mls., having a particle size of about 22 millimicrons, having a pH of 8.8, and a sodium sulfate content of 0.008 N, was ultrafiltered by circulating it through a tubular ultrafilter having a membrane surface area of 0.25 sq. ft., manufactured by the Amicon Corp. of Lexington, Mass. The membrane is characterized as PM-10. The sol was circulated from a tank through a pump and into one end of the tubular ultrafilter at a pressure of 40 psi, moving over the membrane through channels having a thickness of 0.030 inch, and a length of 40 inches, emerging from the channels at atmospheric pressure, and thence returning to the circulating tank. The temperature of the sol was maintained at 80°C. The rate of circulation of the sol through the ultrafilter was 1900 mls. per minute, and the ultrafiltrate passed through the membrane at a rate of 9 mls. per minute.

At this point sufficient sodium sulfate was added to increase the normality of sodium ion in the circulating sol from 0.008 to 0.032 N. Within 6 minutes the viscosity of the sol had been reduced to premit a circulation rate of 2100 mls/min. under the same feed pressure of 40 psi. At the same time there was a 45% increase in the filtration rate to 13 mls/min. The sol was concentrated to 50 grams of $SiO_2$ per 100 mls. by continued removal of ultrafiltrate, with no formation of suspended gel. The sodium sulfate concentration in the sol was 0.025 N and the filtration rate was 5.5 mls/min. More sodium sulfate was added to increase the concentration to 0.053 N and the filtration rate increased to 7.0 mls. per minute, and the sodium sulfate in the filtrate increased to 0.10 N. The sol was further concentrated to 60 g. $SiO_2$/100 mls. and the normality of sodium sulfate dropped to 0.038, while the rate of ultrafiltration decreased to 1.6 mls/min., and the turbidity increased and the circulation rate decreased, indicating flocculation and gelling of the sol under these conditions. The concentration of sodium sulfate in the ultrafiltrate was 0.074 N, while that in the sol was only 0.038 N. It thus appears that a concentration of about 50 grams of $SiO_2$ per 100 mls. was the maximum attainable by ultrafiltration in the presence of 0.05 N sodium sulfate without formation of suspended gel.

EXAMPLE 5

A sol of colloidal silica having a particle size of 14 millimicrons in diameter and a pH of 9.5 was concentrated using an apparatus similar to that used in Example 4. When the concentration of silica reached 40 g. $SiO_2/100$ mls., the sodium sulfate normality was 0.004, and the rate of removal of ultrafiltrate was 5.3 mls/min. Sodium sulfate was then added to give an overall normality of 0.044, and within 5 minutes the rate of ultrafiltration increased 2.6-fold to 14 mls/min. Upon continuing ultrafiltration, the sulfate content of the sol decreased as the silica concentration increased because the concentration of the sodium sulfate in the ultrafiltrate was about twice that of the sol.

EXAMPLE 6

Small particles in a silica sol serving as nuclei can be increased in size by adding a hot solution of sodium silicate to the sol and neutralizing acid while simultaneously removing sodium sulfate by ultrafiltration.

From an agitated reaction vessel, the silica sol to be increased in particle size is pumped through an ultrafilter having a membrane impermeable to the colloidal particles, but permeable to water and soluble salts such as sodium sulfate. The filtrate passed through the membrane is drained, the ultrafiltered sol is passed through a heat exchange tube, heated by steam and is returned to the agitated reaction vessel.

A dilute solution of sodium silicate is fed through a metering pump and mixed with the hot sol in a well agitated zone. Similarly, dilute sulfuric acid is fed through another pump to enter the reaction vessel at a point of high agitation.

Initially to provide silica nuclei, 1.0 liter of a solution of sodium silicate having an $SiO_2/Na_2O$ weight ratio of 3.25 and containing 40 g $SiO_2$ per 100 mls. is added to 39 lites of water in the reaction vessel to give 40 liters of a solution containing 1 g $SiO_2/100$ mils. This mixture is heated to 90°C. Then 1.0 liter of a 3.65 normal solution of sulfuric acid is added over a 15 minute period to neutralize 90% of the alkali of the sodium silicate and produce 41 liters of 1% silica sol in which the particles will serve as nuclei less than 10 millimicrons diameter for growth of larger particles. Then over the next 10 hours, 133 liters of sodium slicate solution containing 3 g $SiO_2/100$ mls. and 133 liters of 0.27 normal solution of sulfuric acid are added simultaneously at equal and constant rates, while the sol is circulated at 90°C. through the ultrafilter at such a rate as to give 30 to 50 psi pressure at the inlet while there is zero to 5 psi back pressure at the outlet. The ultrafilter consists of three parallel tubular units each with 0.030 inch thick channels and 40 inches long made by Amicon Corp., each having a membrane area of 0.25 square feet. Each of these tubes produces ultrafiltrate at the rate of 160 mls. per minute and three tubular filters in parallel are employed to remove in 10 hours 266 liters of water containing some soluble silica and sodium sulfate, thus maintaining the sol volume at about 42 liters. The rate of removal of ultrafiltrate at this stage is held at 148 mls. per minute per tubular filter by increasing the inlet pressure to the filter as required and by increasing the pumping rate. Ten percent of the silica in soluble from form passes through the filter into the filtrate so the silica concentration in the sol will be about 9.5 grams per 100 mls. and the sodium sulfate concentration will be about 0.15 normal.

The salt content is then reduced by diluting the sol from 42 liters to 84 liters with water and then concentrating by removing 42 liters of ultrafiltrate over a period of 1.5 hours at 80°C., leaving 42 liters of sol with 9.5 g $SiO_2$ per 100 mls. and a sodium sulfate concentration of 0.075 N. The sol is then further concentrated to 21 liters of sol containing 19 g $SiO_2$ per 100 mls. in 2 hours, rediluted to 9.5 g./100 mls. and reconcentrated to 19 g/100 mls., again in 2 hours, to reduce the sodium sulfate concentration to 0.037 N; the ultrafiltrate contains 0.038 N $Na_2SO_4$. The sol is then further concentrated to 38 g $SiO_2$ per 100 mls. in 3 hours, and contains 0.025 N $Na_2SO_4$ while the ultrafiltrate contains 0.052 N sodium sulfate.

The sol will have a particle diameter of about 16 millimicrons, is translucent, free of precipitate, and stable in storage at 25°C. for at least 6 months.

A portion of this sol is deionized by passing it through a bed of fixed anion and cation exchange resin and the pH adjusted to pH 9 with concentrated aqueous ammonia. It is then permanently stable in storage, even at 40°C.

EXAMPLE 7

This is an example of a process of this invention for making a concentrated silica sol having a particle size of about 8 to 10 millimicrons in diameter.

The sol is made in a 20 liter reaction vessel or sol tank fitted with a stirrer and a centrifugal circulating pump withdrawing fluid through a valve from the conical bottom of the vessel, and pumping it through a heat exchanger from which it returns into the top of the vessel. A small side stream from the outlet of the circulating pump is passed through a stainless steel heat exchanger to cool the liquid to less than 40°C. in less than a minute, before it flows past the electrodes of a pH meter, and then back to the reaction vessel. There are two small stainless steel feed tubes leading into the intake to within ¼ of the center of the impellor of the pump, so that acid and sodium silicate solution can be introduced separately and mixed with the circulating sol stream under conditions of extreme turbulence. Separate supply tanks for dilute sulfuric acid and sodium silicate solutions are connected to separate metering pumps which force the feed solutions through flowmeters and then to the feed tubes. In this particular example, all the silicate is first placed in the reaction vessel, and only acid is fed into the system.

A dilute solution of sodium silicate is made by diluting 1050 mls. of sodium silicate solution containing a total of 420 grams of $SiO_2$ and 129 grams of alkali as sodium oxide with water to a total volume of 18 liters. Two liters of 1.8 normal sulfuric acid solution are placed in the acid feed tank.

The dilute solution of sodium silicate is circulated through the heat exchanger, the walls of which are heated with steam at a pressure of between 0 and 5 psi., until the temperature in the solution in the tank is 90°C. The pH of the sodium silicate solution at this point is 11.1. Acid is then fed through the acid feed line into the circulating stream in the circulating pump at an average rate of about 50 mls. per minute. When half of the acid has been added, the pH of the hot circulating solution is 10.6. When 1.6 liters of acid has been added, the rate of addition of acid is reduced so that the pH in the circulating stream does not drop below 9. The total addition time for the two liters of dilute acid is 54 minutes.

At this time, the pH of the 19.5 liters of sol is 9.3. The steam is then turned off the heat exchanger and the sol is circulated for one hour while the temperature drops from 89° to 63°C. The specific surface area of the colloidal silica at this point, determined by the Sears method of titration, is 426 m$^2$/g. The normality of the sodium sulfate in the sol is 0.186, as determined by titrating with barium chloride solution.

The outlet at the bottom of the reaction vessel or sol tank is also connected through a second valve to a multistage centrifugal pump which has a circulation capacity of 5 gallons per minute against a pressure head of over 50 psi. The pump circulates the sol through an ultrafilter at the outlet of which there is a release valve set so that the inlet pressure to the ultrafilter is 40 psi. and the outlet pressure is about 35 psi., while the sol is being circulated through the filter at a rate of around 4 gallons per minute. The working surface area of the ultrafilter is 7.5 sq. ft. and the pore diameter is such that less than 0.05% of silica passes through into the effluent filtrate, mainly as dissolved silica. The total cross-sectional area of the channels is about one square inch, made up of 145 parallel identical square channels, 27.5 inches in length.

The sol which initially contains 2.14 grams of SiO$_2$ per 100 mls. and a sodium sulfate concentration of 0.18 normal is heated and held at a constant temperature of 70 to 75°C., is circulated through the ultrafilter while another stream is circulated through the heat exchanger to maintain temperature. During the first stage of the ultrafiltration, three liters of water are fed into the sol tank to maintain a constant volume of 19.5 liters of sol in the system while 3 liters of ultrafiltrate are withdrawn at a rate of 0.6 liters per minute. At this point, while the silica concentration remains at 2.1%, the removal of sodium sulfate in the ultrafiltrate results in a reduction of the sulfate concentration in the sol from 0.18 to 0.158 normal. Then the water feed is stopped and 6.3 liters of ultrafiltrate are withdrawn, concentrating the sol to a volume of 13.5 liters and a silica concentration of 3.06 grams of SiO$_2$ per 100 milliliters.

Then 3.7 liters of water are added while 3.5 liters of ultrafiltrate are withdrawn, thus reducing the normality of sodium sulfate to 0.114. This then permits the silica to be concentrated to 4.15% by withdrawing 3.5 liters of ultrafiltrate without adding water. At this point, 2.3 liters of water are added to maintain a constant sol volume of 10 liters, while withdrawing 2.3 liters of ultrafiltrate, reducing the sodium sulfate normality to 0.93. The water feed is turned off, and 4.2 volumes of ultrafiltrate are withdrawn, leaving a sol volume of 5.5 liters containing 7.5% silica.

While it would have been advantageous to continue to alternate concentrating and washing the sol to still smaller volumes, it is not possible with this particular arrangement of equipment to circulate less than about 4.5 liters of sol volume. Accordingly, while the sol volume remains at 4.5 liters, 18 liters of water were added to maintain constant volume while 18 liters of ultrafiltrate were removed; this reduces the sodium sulfate normality to 0.02 normal. The water feed is stopped and the sol is then concentrated by ultrafiltration to a final volume of 4.7 liters containing 8.7 grams of SiO$_2$ per 100 mls. Since the final sol contains an estimated 408 grams of SiO$_2$, the total volume of ultrafiltrate amounted to 42.2 liters, with an average silica analysis of about 0.5 grams per liter, or a total silica loss of 21 grams, or 5% by weight.

Thirteen liters of sol prepared in the above manner are placed in the circulating tank and washed by adding water to maintain constant volume while ultrafiltration was continued until 34 liters of filtrate had been collected, the SiO$_2$ content was 18.5 g/100 ml., and the sulfate content had been reduced to 0.013 normal. The sol was then removed and concentrated in a forced circulation evaporation at atmospheric pressure until the silica content was 34.5% by weight. It was then filtered through diatomaceous earth as a filter aid and diluted to 30.5% by weight of silica. The pH was 9.0 and the sulfate concentration was 0.027 normal. The transmission of 400 nm light through a 21 mm diameter cuvette containing the sol diluted to 1% SiO$_2$ was 41%.

EXAMPLE 8

Using the equipment described in Example 7, a "heel", or sol containing particles to serve as nuclei for growing larger particles, is placed in the reaction or circulating tank which is connected through a centrifugal circulating pump to the heat exchanger, but is not connected to the ultrafilter system. This heel consists of two liters of a silica sol having a particle size of about 8.5 millimicrons, with a specific surface area of 325 m$^2$/g., and contains 10.5 grams of SiO$_2$ per 100 mls. This is heated to 90°C. and over a period of 0.82 hours nine volumes of sodium silicate solution containing 4.6% SiO$_2$ and 1.4% alkali as Na$_2$O, is fed into the circulating solution through one of the feed lines and an equal volume of 0.40 normal sulfuric acid is fed into the other feed line at an equal rate so that the pH of the sol being returned from the heat exchanger to the tank is held between 9 and 10. By this means, 20 liters of a sol containing 3.2% SiO$_2$ are obtained with a pH of 9.25, 85% of the alkali being neutralized, and the silica particles having a specific surface area of 290 m$^2$/g. This sol contains sodium sulfate at a concentration of 0.18 normal. Following the ultrafiltration and washing cycle described in Example 1, a purified, concentrated sol is produced, having silica concentration of 13.0 grams per 100 mls., a sulfate normality of 0.018, a specific surface area of 256 m$^2$/g., a pH of 9.35, and essentially free from aggregated particles. When the sol was diluted to a concentration of 1% SiO$_2$ and the transmittance of 400 millimicron wavelength light measured in a round cuvette having a diameter of 21 millimeters, 82% of the light was transmitted. This sol is suitable for deionization to remove electrolytes, restabilization to pH 9 by adding sodium hydroxide solution and concentration to a stable sol containing 30 weight percent silica by evaporation of water.

EXAMPLE 9

This is an example of making a stable concentrated silica sol containing 50% by weight of silica of particles about 21 millimicrons in diameter.

Using the apparatus described in Example 8, a heel of colloidal silica is employed containing 2% of silica having a specific surface area of 225 m$^2$/g. and a particle diameter of about 12 millimicrons. The heel sol is circulated through the heat exchanger until the temperature is 85°C., and heating continued while 9 liters of 4.65% silica in the form of sodium silicate having a molecular ratio of SiO$_2$ to Na$_2$O to 3.25, and nine liters of 0.395 normal sulfuric acid are added separately in about equal proportions and at equal rates to maintain the pH of the sol between 9 to 10. These additions are made at a uniform rate over a period of 2.2 hours, corresponding to a build-up rate of 14.5 grams of silica per hour added per 1000 sq. meters of silica surface in the heel. There is thus obtained a sol containing 2.4% silica having a specific surface area of 167 m²/g. and containing a concentration of sodium sulfate of 0.18 normal.

This sol is then purified and concentrated by ultrafiltration following the procedure of Example 8, thus obtaining a sol containing 10.3% silica having a specific surface of 130 m²/g., corresponding to a particle diameter of about 22 millimicrons, and a concentration of sodium sulfate of 0.019 normal. A sample diluted to 1% silica in a 21 millimeter diameter cuvette has a transmittance of 49% measured with 400 millimicron wavelength light. This sol is then deionized by passing it through a bed of mixed anion and cation exchange resin, the pH then adjusted to 9.0 by the addition of ammonia and 0.1% by weight of ammonium sulfate is added as a concentrated aqueous solution with intense agitation of the sol at the point of addition, and then water is evaporated from the sol until the silica concentration is 50% by weight.

I claim:

1. A process for increasing the size of colloidal silica particles in an aqueous silica sol containing from 1 to 10% by weight silica consisting essentially of mixing with the sol at 80 to 100°C., a feed of sodium silicate solution and a solution of sulfuric acid, hydrochloric acid or carbon dioxide, the concentration of silica in the feed being below 0.6 times the weight ratio of $SiO_2$:$Na_2O$ in the sodium silicate, the molar ratio of sodium silicate to sulfuric acid, hydrochloric acid or carbon dioxide in the feed being such to maintain the pH of the sol from 8 to 10 and the sodium salt concentration of the sol not above 0.2 normal and ultrafiltering the sol using a microporous membrane having pores smaller than the silica particles in the sol to remove sodium salt solution, while maintaining the concentration of sodium in the sol from $N = 0.005$ to $N = 0.26 - 0.005C - 0.002 (T-40)$ where N is the normality of the sodium in the sol, T is the temperature in degrees centigrade and C is the grams of silica per 100 milliliters of sol by the addition of water.

2. The process of claim 1 wherein the maximum allowable concentration of sodium ions present during ultrafiltration is defined by the following equations:

$$\log_{10}C = -2.2 - 3.2 \log_{10}N_{80}$$

$$N_T = N_{80} + 0.002 (80-T)$$

where $N_{80}$ and $N_T$ are greater than 0.005;

$N_{80}$ is the normality of the salt in the sol when ultrafiltering at 80°C.;

$N_T$ is the normality of the salt in the solution at T °C.;

T is the temperature in degrees centigrade at which ultrafiltration is carried out; and C is the concentration of silica expressed in grams of $SiO_2$ per 100 milliliters.

3. The process of claim 1 wherein sulfuric acid is employed in the feed.

4. The process of claim 2 wherein sulfuric acid is employed in the feed.

5. The process of claim 1 wherein the silica particles are first increased in size, and then the sol is ultrafiltered.

6. The process of claim 1 wherein the silica particles are increased in size and the sol ultrafiltered simultaneously.

* * * * *